United States Patent
Moscoso et al.

(10) Patent No.: US 7,617,750 B2
(45) Date of Patent: Nov. 17, 2009

(54) PROCESS OF PRODUCING NANOCRYSTALLINE BODIES

(75) Inventors: Wilfredo Moscoso, West Lafayette, IN (US); James B. Mann, West Lafayette, IN (US); M. Ravi Shankar, West Lafayette, IN (US); Srinivasan Chandrasekar, West Lafayette, IN (US); Walter Dale Compton, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 154 days.

(21) Appl. No.: 11/567,293

(22) Filed: Dec. 6, 2006

(65) Prior Publication Data

US 2008/0138163 A1 Jun. 12, 2008

(51) Int. Cl.
*B21C 23/01* (2006.01)
(52) U.S. Cl. .......................................... 82/1.11; 82/123
(58) Field of Classification Search .................. 82/1.11, 82/118, 123, 133, 134; 148/400, 308
See application file for complete search history.

(56) References Cited

U.S. PATENT DOCUMENTS

| | | | | |
|---|---|---|---|---|
| 5,651,648 | A * | 7/1997 | Furey et al. | 409/131 |
| 5,911,802 | A * | 6/1999 | Kimura et al. | 82/1.11 |
| 6,585,148 | B2 * | 7/2003 | Aono et al. | 228/112.1 |
| 6,706,324 | B2 * | 3/2004 | Chandrasekar et al. | 427/255.11 |
| 7,240,562 | B2 * | 7/2007 | Fang et al. | 73/789 |
| 7,294,165 | B2 * | 11/2007 | Chandrasekar et al. | 75/229 |
| 2006/0243107 | A1 | 11/2006 | Mann et al. | |
| 2006/0248980 | A1 * | 11/2006 | Mann et al. | 75/246 |

(Continued)

FOREIGN PATENT DOCUMENTS

WO WO 02061151 A2 * 8/2002

(Continued)

OTHER PUBLICATIONS

L. de Chiffre; "Extrusion cutting of Brass Strips", Int. J. Mach. Tool Des. Res, vol. 23, No. 2/3, 1983; pp. 141-151.

(Continued)

*Primary Examiner*—Boyer D Ashley
*Assistant Examiner*—Sara Addisu
(74) *Attorney, Agent, or Firm*—Hartman & Hartman, P.C.; Gary M. Hartman; Domenica N. S. Hartman

(57) ABSTRACT

A process by which nanostructured monolithic bodies can be produced in a single continuous operation, as opposed to multi-stage deformation processing. The process generally entails continuously producing a chip having a nanostructured microstructure by engaging a solid body with a cutting edge of a tool while the solid body and the cutting edge move relative to each other, and simultaneously extruding the chip in the immediate vicinity of the cutting edge, such as with a constraining member, as the chip is separated from the solid body by the cutting edge to continuously plastically deform the chip and produce a nanostructured monolithic body immediately downstream of the cutting edge. The shape and size of the chip can be simultaneously controlled by the extrusion process so that the nanostructured monolithic body has a predetermined geometry. The nanostructured monolithic body can be in the form of a product suitable for immediate use, or undergo further processing to yield a product.

19 Claims, 6 Drawing Sheets

U.S. PATENT DOCUMENTS

2006/0251480 A1 * 11/2006 Mann et al. ................ 408/1 R
2006/0278308 A1 * 12/2006 Shankar et al. ............ 148/513

FOREIGN PATENT DOCUMENTS

WO    WO 2006094325 A1 *  9/2006
WO    WO 2006119359       11/2006

OTHER PUBLICATIONS

Sastry Shankar M L, et al; "Comparison of the Deformation Behavior of Ultra Fine Grained Copper Produced By Particulate Processing And Bulk Deformation Processing", Proc. TMS Fall Meet; Proceedings of the TMS Fall Meeting 1999; Minerals, Metals & Materials Soc., Warrendale, PA, USA, 1999; pp. 537-545.

* cited by examiner

Ta  Cu

A    B    C

PROCESS OF PRODUCING NANOCRYSTALLINE BODIES

BACKGROUND OF THE INVENTION

The present invention generally relates to methods of producing materials and articles with nanocrystalline and ultra-fine grained (UFG) (together called nanostructured) microstructures, and more particularly to directly producing monolithic bodies having nanostructured microstructures through a machining process.

Significant benefits can be gained by deforming metals and metal alloys through the application of very large plastic strains. Principal among these are microstructure refinement and enhanced mechanical and physical properties. Of particular current interest is the use of "severe" plastic deformation (SPD) to produce bulk solids with nanostructured microstructures, i.e., ultra-fine grained (UFG) microstructures, especially nanocrystalline structures (NS) characterized by their atoms arranged in crystals with a nominal dimension of less than one micrometer, particularly less than 500 nm. Nanocrystalline solids have become of interest because they appear to exhibit improved strength, ductility, formability and resistance to crack propagation compared to microcrystalline materials, and possess interesting chemical, optical, magnetic and electrical properties. Nanocrystalline solids also appear to respond to radiation and mechanical stress quite differently than microcrystalline materials (comprising crystals with a nominal dimension of one micrometer to less than one millimeter), and their response can be varied by changing the crystal size. Materials made by consolidating nanocrystalline powders have also been shown to have enhanced attributes not typically found in conventional materials. As a result, nanocrystalline materials are believed to have significant potential for use in industrial applications, provided they can be manufactured in a cost-effective manner.

Multi-stage deformation processing is one of the most widely used experimental SPD techniques for studying microstructural changes produced by very large strain deformation. Notable examples include rolling, drawing, high-pressure torsion (HPT), and equal channel angular extrusion (ECAE) processes. In a multi-stage deformation process, very large plastic strains (shear strains of four or more) are imposed in a specimen by the cumulative application of deformation in multiple discrete stages, the effective strain in each stage of deformation being on the order of two. The formation of micro- and nanocrystalline structures has been demonstrated in a variety of ductile metals and alloys using multi-stage deformation processing. However, there are significant limitations and disadvantages with this processing technique. A significant limitation is the inability to induce large strains in high-strength materials, such as nickel-based high-temperature alloys and tool steels. Other limitations include the difficulty of imposing strains of much greater than one and inability to impose strains of much greater than two in a single stage of deformation, the considerable uncertainty of the deformation field, and the minimal control over the important variables of the deformation field—such as strain, temperature, strain rate and phase transformations—that are expected to have a major influence on the evolution of microstructure and material properties.

A widely used technique for synthesizing nanocrystalline metals has been condensation of metal atoms from the vapor phase. In this technique, the metal is evaporated by heating and the evaporated atoms then cooled by exposure to an inert gas such as helium or argon to prevent chemical reactions, thereby enabling the purity of the metal to be maintained. The cooled atoms condense into single-crystal clusters with sizes typically in the range of 1 to 200 nm. The production of ceramic nanocrystals is similar, except that evaporated metal atoms are made to react with an appropriate gas, e.g., oxygen in the case of oxide ceramics, before they are allowed to condense. The resulting nano-sized particles may be compacted and sintered to form an article, often at a sintering temperature lower than that required for a microcrystalline powder of the same material. In any case, the sintering temperature must be kept sufficiently low to inhibit grain growth and retain the fine grained structure. While suitable for making powders and small compacted samples with excellent control over particle size, the condensation method is at present not practical for most applications other than experimental. A particularly limiting aspect of the condensation method is the difficulty of forming nanocrystalline materials of alloys because of the challenges associated with controlling the composition of the material from the vapor phase. Another limiting aspect of the condensation method is that high green densities in powder compacts are more difficult to achieve as a result of the nano-size particles produced. Furthermore, the nano-sized particles suffer from problems of agglomeration and oxidation due to their high surface area to volume ratio. Other methods that have been explored to synthesize nanocrystalline materials include aerosol, sol-gel, high-energy ball-milling, and hydrothermal processes. However, these techniques are limited in the range of alloys that can be produced, and have not produced nanocrystalline materials at a cost acceptable for practical applications.

From the above, it can be seen that more controllable and preferably low-cost approach are desired for synthesizing nanocrystalline solids for use in the manufacture of products. It is also desired to produce nanocrystalline solids from a wide variety of materials, including very hard materials and alloys that are difficult or impossible to process using prior art techniques. A solution to the above-noted shortcomings of the prior art is provided in commonly-assigned U.S. Pat. No. 6,706,324 to Chandrasekar et al., which discloses machining techniques for the large scale production of nanostructured (nanocrystalline and UFG) materials. According to Chandrasekar et al., whose teachings are incorporated herein by reference, large strain deformation during chip formation in machining leads to significant grain refinement and development of nanocrystalline and UFG microstructures in a wide variety of materials, including metals and alloys. The deformation that occurs in the shear plane of a chip can be seen in reference to FIG. 1, which represents the machining of a workpiece surface with a wedge-shaped indenter (tool). The material being removed by large strain deformation, namely, the chip, slides over the surface of the tool known as the rake face. The angle between the rake face of the tool and the normal to the work surface is known as the rake angle ($\alpha$), which may be positive or negative as indicated in FIG. 1. The edge of the tool penetrating the workpiece is the cutting edge. The amount of interference between the tool and the workpiece is the undeformed chip thickness depth of cut ($t_o$) and the relative velocity between the tool and the workpiece is the cutting velocity ($V_c$). When the tool's cutting edge is perpendicular to the cutting velocity and the width of cut is large compared $t_o$, a state of plane strain deformation prevails, which is a preferred configuration for experimental and theoretical investigations of machining (though not a necessary condition for making nanostructured materials).

The chip formation in FIG. 1 is seen to occur by concentrated shear along a plane called the shear plane, where a shear strain ($\gamma$) is imposed during chip formation. The shear strain can be estimated by Equation (1) below:

$$\gamma = \cos\alpha / \sin\phi \cos(\phi - \alpha) \qquad \text{(Eq. 1)}$$

where the shear plane angle ($\phi$) is a known function of $t_o$ and $t_c$. The effective Von Mises strain ($\epsilon$) can be predicted using $$\epsilon = \gamma/(3)^{1/2} \qquad (Eq. 2)$$

Equation (1) shows that the shear strain ($\gamma$) can be varied over a wide range by varying the rake angle ($\alpha$) from large positive to large negative values. Additionally, the friction at the tool-chip interface also affects shear strain ($\gamma$) via its effect on the shear plane angle $\phi$.

In view of the above, Chandrasekar et al. teach that effective plastic strains in the range about 0.5 to about 10 and strain rates of up to $10^5$ per second can be generated with appropriate machining conditions, as can a wide range of shear plane temperatures. These ranges of values are substantially greater than can be realized in typical severe plastic deformation processes. Geometric parameters of machining like depth of cut ($t_o$) rake angle ($\alpha$) and cutting velocity ($V_c$) affect the shear deformation in a manner analogous to the action of dies in forging or extrusion. The effective plastic strain along the shear plane (deformation zone) in the chip can be systematically varied in the range of about 0.5 to about 10 by changing the tool rake angle, and to a lesser extent by changing the friction between tool and chip. The mean shear and normal stresses on the shear plane can be varied by changing the tool geometric parameters together with process parameters such as $V_c$ and $t_o$, while the values of these stresses can be obtained from measurement of the forces. Finally, the temperature in the deformation zone can be systematically varied by changing the cutting velocity. For example, by cutting at very low velocities (about 0.5 mm/s), the temperature can be kept marginally above the ambient temperature while achieving very large strain deformation. Alternatively, temperatures where phase transformations (e.g., martensitic, melting) may be expected to occur in the chip can be realized by increasing the cutting velocity to higher values, for example, about 1 to about 2 m/s. The ability to change the friction along the tool-chip interface by a factor of up to three has also been demonstrated using low-frequency modulation of the tool-chip interface in conjunction with lubrication. The modulation assures that lubricant is always present at the interface between the tool and the chip. The extent to which friction (as well as the other parameters and conditions discussed above) can be controlled in a machining operation is not possible in other severe plastic deformation processes. In summary, the temperature, stress, strain, strain rate and velocity fields in the zone of deformation can be well estimated using available mechanics models or obtained by direct measurement. (See, for example, S. Lee, J. Hwang, M. Ravi Shankar, S. Chandrasekar and W. D. Compton, Metallurgical and Materials Transactions, Vol. 37A, 1633-1643, May 2006; M. Ravi Shankar, B. C. Rao, S. Lee, S. Chandrasekar, A. H. King and W. D. Compton, Acta Materialia, Vol. 54, 3691-3700, 2006.) Thus, very large strain deformation conditions can be imposed and varied systematically over a wide range, a range over and beyond that currently obtainable in other severe plastic deformation processes.

In view of the above, the teachings of Chandrasekar et al. provide a basis for producing material (such as continuous chips including ribbons, wires, filaments, etc., and discontinuous chips including particulates, platelets, etc.) having nanocrystalline and UFG microstructures in a wider group of materials and at lower costs compared to other processes capable of producing materials with nanocrystalline microstructures. For example, chips machined from 6061-T6 aluminum stock with a +5 degree rake tool have been produced to have generally equi-axed grains with a typical grain size of about 75 nm. As a result of the grain refinement achieved during machining, chips have been produced that exhibit hardnesses of about 150 HV, up to 50% harder than the original bulk stock, as reported in M. R. Shankar, S. Chandrasekar, A. H. King and W. D. Compton, Acta Materialia, Vol. 53, 4781-93, 2005. Such nanostructured chips can be consolidated into components or structures, for example, using powder metallurgy (PM) processes, powder extrusion, forging, spraying methods such as cold-spray, etc., as well as serve as important constituents in metal and polymer matrix composites. A further advancement based on Chandrasekar et al. is the capability of controllably producing nanostructured chips with a desired shape and size, as disclosed in commonly-assigned U.S. patent application Ser. No. 11/381,392 to Mann et al.

Notwithstanding the advancements achieved through the teachings of Chandrasekar et al., further capabilities in the production of articles having nanocrystalline and UFG microstructures are desirable.

BRIEF SUMMARY OF THE INVENTION

The present invention provides a process by which nanostructured monolithic bodies can be produced in a single continuous operation, as opposed to multi-stage deformation processing employed in the past that involve a series of separate and discrete deformation operations or stages. Nanostructured monolithic bodies produced by the process of this invention can be in the form of a product suitable for immediate use, or undergo further processing to yield a suitable product.

The process of this invention generally entails continuously producing a chip having a nanostructured microstructure by engaging a solid body with a cutting edge of a tool while the solid body and the cutting edge move relative to each other, and simultaneously extruding the chip in the immediate vicinity of the cutting edge, such as with a constraining member, and as the chip is separated from the solid body by the cutting edge to continuously plastically deform the chip and produce a nanostructured monolithic body immediately downstream of the cutting edge. The shape and size of the chip can be simultaneously controlled by the extrusion process so that the nanostructured monolithic body has a predetermined geometry. It should be emphasized that the process of this invention is not chip formation followed by extrusion of the chip, because the dimensions and geometry of the chip are controlled at the point of chip formation. Because of the essentially instantaneous transformation of the chip into the extruded monolithic body, the extruded monolithic body—including its cross-sectional shape and microstructure—is created while still attached to the body from which it was machined. Therefore, the term "chip" will be used for convenience to denote a material immediately after being acted upon by some type of cutting feature during a machining operation, including while still attached to the body from which it was machined, and is not limited to a chip after it has been separated the body from which it was machined.

Formation of the nanocrystalline or UFG microstructure within the monolithic body is the result of imposing a sufficiently large strain deformation with the cutting tool. Such strains can be induced in solid bodies formed of a variety of materials, including metals, metal alloys, intermetallics, composites, and ceramic materials. Furthermore, the original solid body may have a microstructure that is essentially free of nano-crystals, and may even have a single-crystal microstructure. Cutting speed does not appear to be determinative, such that essentially any cutting speed can be used (other than speeds that would cause temperature-time conditions resulting in loss of the desired UFG or nanocrystalline microstructure). By using a machining operation where parameters can be precisely controlled, monolithic bodies having a desired nanocrystalline or UFG microstructure can be accurately and repeatably produced from a given type of material. Furthermore, machining operations can be adjusted to directly produce monolithic bodies with UFG or nanocrystalline microstructure and having various macroscopic shapes (in terms of length and cross-section) suitable for use in a variety of applications. For example, a nanostructured monolithic body can be directly produced in the form of a foil, sheet, bar, wire, ribbon, or filament, which may then be directly used in an application or as a pre-cursor material from which components can be made. In contrast, the geometries of chips produced by conventional machining are poorly controlled.

It is worth noting that the production of nanostructured monolithic bodies can often be achieved with this invention without having any negative impact on the article being machined, such that a nanostructured monolithic body can be produced as a useful byproduct of an existing manufacturing operation. In contrast, chips formed by machining operations have been viewed as scrap, and therefore simply discarded or melted for recycling.

As a foil, sheet, bar, wire, ribbon, filament, etc., a monolithic body formed by the extrusion process of this invention can be continuous, as opposed to more discrete particulate or platelet-type chips, and subsequently separated or broken to have a particular length. The monolithic body can also be a final product suitable for use as-is, or undergo further processing (e.g., thermal and thermo-mechanical treatments) to yield a final product that consists essentially or entirely of nano-crystals or of grains grown from nano-crystals. The monolithic body can also undergo subtractive processes (e.g., machining, etching, etc.) or additive processes (e.g., coating, bonding, etc.), for example, as disclosed in commonly-assigned U.S. patent application Ser. No. 11/381,387 to Mann et al., whose teachings are incorporated herein by reference. As such, the process of the present invention is suitable for producing a wide variety of products, including large-scale articles and small-scale articles capable of exhibiting enhanced structural and mechanical performance as a result of their UFG and especially nanocrystalline microstructures. Alternatively, the monolithic body can be comminuted and dispersed in a matrix material or can be one of a plurality of monolithic bodies dispersed or embedded in a matrix material, such that the final product is a composite material in which the monolithic body or fragments thereof serve as a reinforcement material.

In view of the above, the present invention provides a controllable and low-cost method for synthesizing nanostructured materials that can be used to produce monolithic and composite products. The process of this invention also makes possible the capability of producing nanostructured materials whose compositions or properties have rendered the materials difficult or impossible to process using prior art techniques, such as very hard materials that cannot be processed by multi-stage deformation processes and alloys that cannot be processed by the condensation method.

Other objects and advantages of this invention will be better appreciated from the following detailed description.

DETAILED DESCRIPTION OF THE INVENTION

The following discussion is directed to a process by which nanostructured monolithic bodies can be produced in a continuous operation that imposes large values of deformation strain (for example, shear strains of about two to as much as eight, or potentially more) in a single pass or stage. Such an approach is in contrast to multi-stage deformation processes used in the past that achieve large cumulative deformation strain through a series of separate and discrete deformation operations or stages, in which the effective strain imposed in each stage of deformation is typically two or less. The preferred process can be carried out with a machining operation that combines the processes of chip formation and extrusion. For convenience, such a combined machining-extrusion process can be referred to as large strain extrusion machining (LSEM). By combining the advantages of chip formation in machining with that of extrusion processing, dimensionally-controlled, UFG and nanocrystalline materials can be produced by appropriately controlling the geometric parameters of the deformation field created during chip formation in a machining operation.

Conventional machining techniques typically result in relatively small chip sizes, albeit severely deformed and often composed entirely of a UFG microstructure. Furthermore, unlike SPD techniques, chips formed by conventional machining have seemingly random geometries and geometric control of the deformed material is not usually feasible. With the present invention, a level of control is achieved over the geometry of a chip produced by machining, while also imposing sufficiently large deformation strains to form a nanostructured, and often more preferably nanocrystalline, microstructure. In this manner, the advantages of a large strain deformation achievable with machining are combined with dimensional controls achievable with extrusion processes. The machining and extrusion processes are combined in a single-stage operation that can employ relatively low deformation rates to produce a nanocrystalline or UFG microstructure while suppressing in-situ heating and microstructure coarsening.

Figure 1:
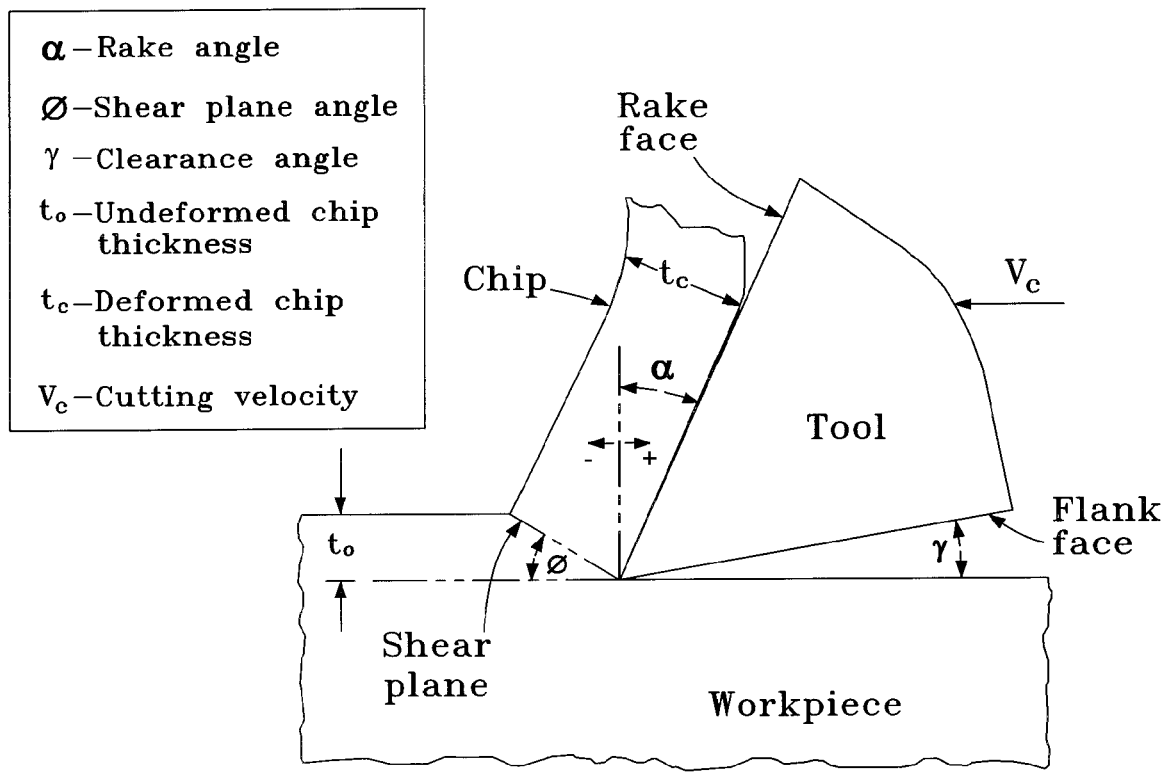
FIG. 1 schematically represents the process of machining a body with a cutting tool to produce nanostructured chips in accordance with the prior art.
Figure 2:
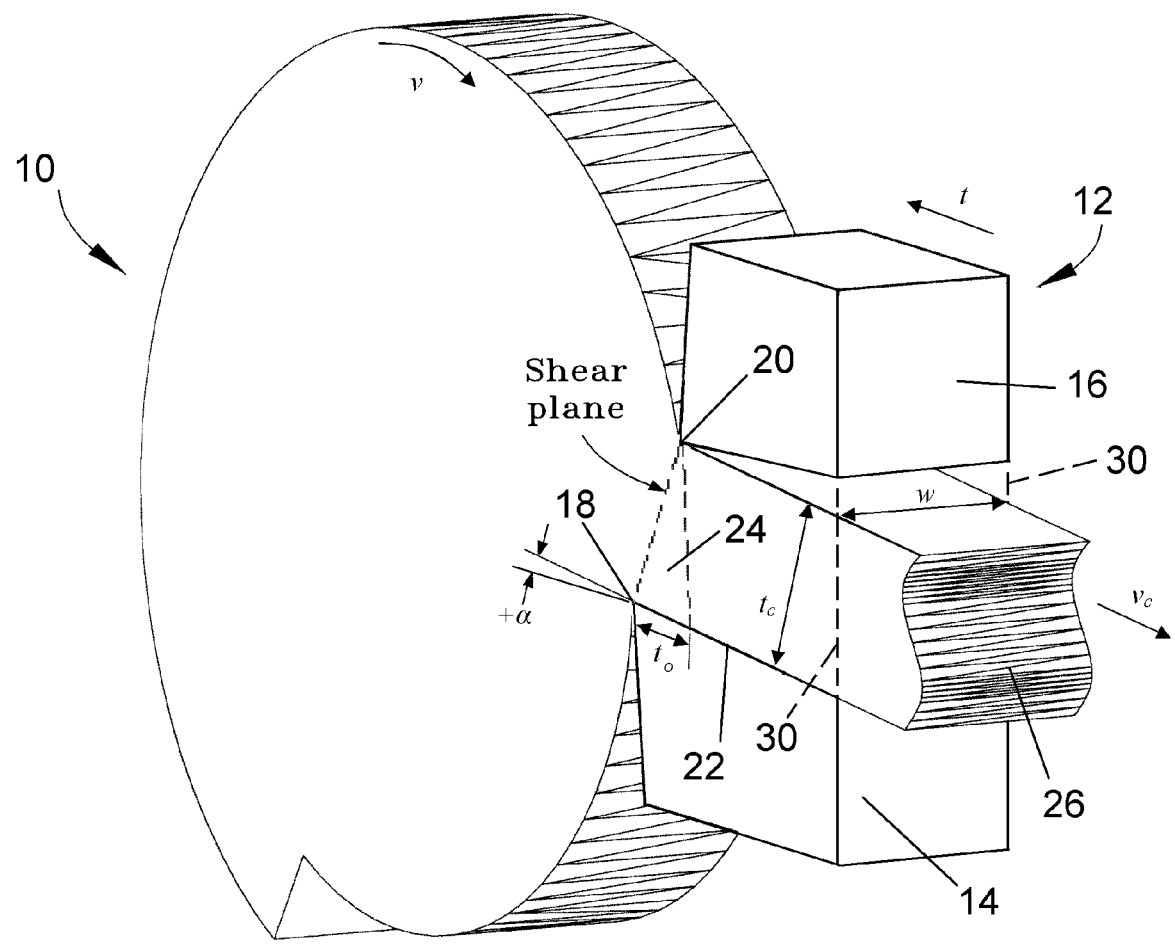
FIG. 2 schematically represents a cutting tool adapted for both cutting and simultaneously extruding a chip produced during machining of a body in accordance with an embodiment of this invention.

FIG. 2 illustrates one technique for combining machining and extrusion processes in a single-stage operation. The operation is illustrated as being a turning operation, such as on a lathe, in which a workpiece 10 is rotated while a relatively stationary cutting tool assembly 12 is fed in a generally radial direction into the workpiece 10. The workpiece 10 is a solid body that can be formed of a wide variety of materials, such as a metal or metal alloy, intermetallic, composite, or ceramic material. Furthermore, the workpiece 10 may have a microstructure that is essentially free of nano-crystals, and may even have a single-crystal microstructure. While a turning operation is represented, other machining operations are also within the scope of the invention, including others where relative movement between a workpiece and cutting tool is primarily through movement of the workpiece against a relatively stationary cutting tool, as well as linear machining operations in which relative movement between the workpiece and cutting tool is primarily through movement of the cutting tool against a relatively stationary workpiece, or vice versa.

As the tool assembly 12 is plunged into the workpiece 10 at a given feed rate t (m/rev) and the workpiece 10 rotates with a given surface velocity v (m/s), material is cut and extruded from the workpiece 10, producing a long, continuous extrusion 26 of width (w) and thickness ($t_c$). The rate of production (i.e., the length of plate produced per unit time) is the chip velocity $v_c$ ($v_c$=v t/$t_c$). The cutting tool assembly 12 is represented as including two members 14 and 16. Though schematically depicted as being completely separate from each other, the members 14 and 16 are preferably physically coupled or attached to each other to enable their positions relative to each other to be accurately maintained during use of the cutting tool assembly 12. For this purpose, the members 14 and 16 can be mounted so that one or both are accurately adjustable relative to the other, or can be portions of a unitary body that was machined or otherwise processed so that the members 14 and 16 are permanently fixed relatively to each other, effectively defining opposing walls of an extrusion die. Furthermore, though the members 14 and 16 are shown as defining only two opposing walls or surfaces that define a passage through which the extrusion 26 travels, the cutting tool assembly 12 or its members 14 and/or 16 could be formed to also provide lateral walls that interconnect the opposing surfaces of the members 14 and 16, effectively defining an orifice of an extrusion die. A particular example of an suitable tool for use with this invention is disclosed in W. Moscoso, M. R. Shankar, J. B. Mann, W. D. Compton and S. Chandrasekar, Bulk Nanostructured Materials by Large Strain Extrusion Machining (LSEM), Journal of Materials Research (accepted for publication), whose contents are incorporated herein by reference.

In reference to the orientation depicted in FIG. 2, the lower member may be termed a cutting member 14 and defines a cutting edge 18 for cutting the workpiece 10. The upper member in FIG. 2 may be termed a constraining member 16, which is shown as being wedge-shaped and defining a constraint edge 20 that constrains an initial volume of material 24 being removed from the workpiece 10. Once dislocated from its original location on the workpiece 10, this volume of material 24 will be referred to as a chip 24, and the constraining member 16 imposes dimensional control over the chip 24 to form the extrusion 26. The constraint edge 20 of the constraining member 16 and the rake face 22 of the cutting member 14 define an opening within which the chip 24 is constrained as it is dislocated from the workpiece 10, thereby defining the size and shape of the resulting deformed extrusion 26 exiting the tool assembly 12. As a single-pass process, deformation parameters must ensure large values of strain that are sufficient to induce formation of a UFG or nanocrystalline microstructure within the deformed extrusion 26. As will be discussed in more detail below, investigations leading to the present invention demonstrated that the deformation strain, and consequently the resulting microstructure in the extrusion 26, can be controlled by modifying the geometry of deformation through suitable positioning of the constraint edge 20 relative to the cutting edge 18 and rake face 22 of the cutting tool assembly 12. Additionally, application of a compressive force opposing the flow of the extrusion 26 at the exit of the tool assembly 12 may be used to increase the amount of imposed deformation strain. This compressive force may be applied by means such as a hydraulic device or through the use of a member that restricts the flow of the extrusion 26 at the exit of the tool assembly 12.

Certain investigations leading to the present invention included the use of a machining setup based on that schematically represented in FIG. 2, in which the tool cutting edge 18 is perpendicular to the cutting velocity and a state of plane strain deformation prevails. As the workpiece 10 rotates at a constant velocity (v), the chip 24 machined from the workpiece 10 is simultaneously forced through the opening formed by and between the rake face 22 and the constraint edge 20. The material of the workpiece 10 is continuously fed to the tool assembly 12 by advancing the tool assembly 12 towards the workpiece at a constant feed rate (t). As the initially undeformed chip 24 passes through the opening, deformation takes place in a wedge-shaped region bounded by the shear plane. Based on upper bound theory, the deformation shear strain depends on the tool rake angle ($\alpha$) and the thickness ratio ($\lambda$), the latter of which is defined as the ratio of the thickness ($t_o$) of the undeformed chip 24 to the thickness ($t_c$) of the extrusion 26 ($\lambda=t_o/t_c$). The tool rake angle ($\alpha$) is depicted in FIG. 2 as being positive. In this upper bound model, the deformation shear strain ($\gamma$) is given by:

$$\gamma = \lambda/\cos\alpha + 1/\lambda \cos\alpha - 2\tan\alpha$$

Figure 3:
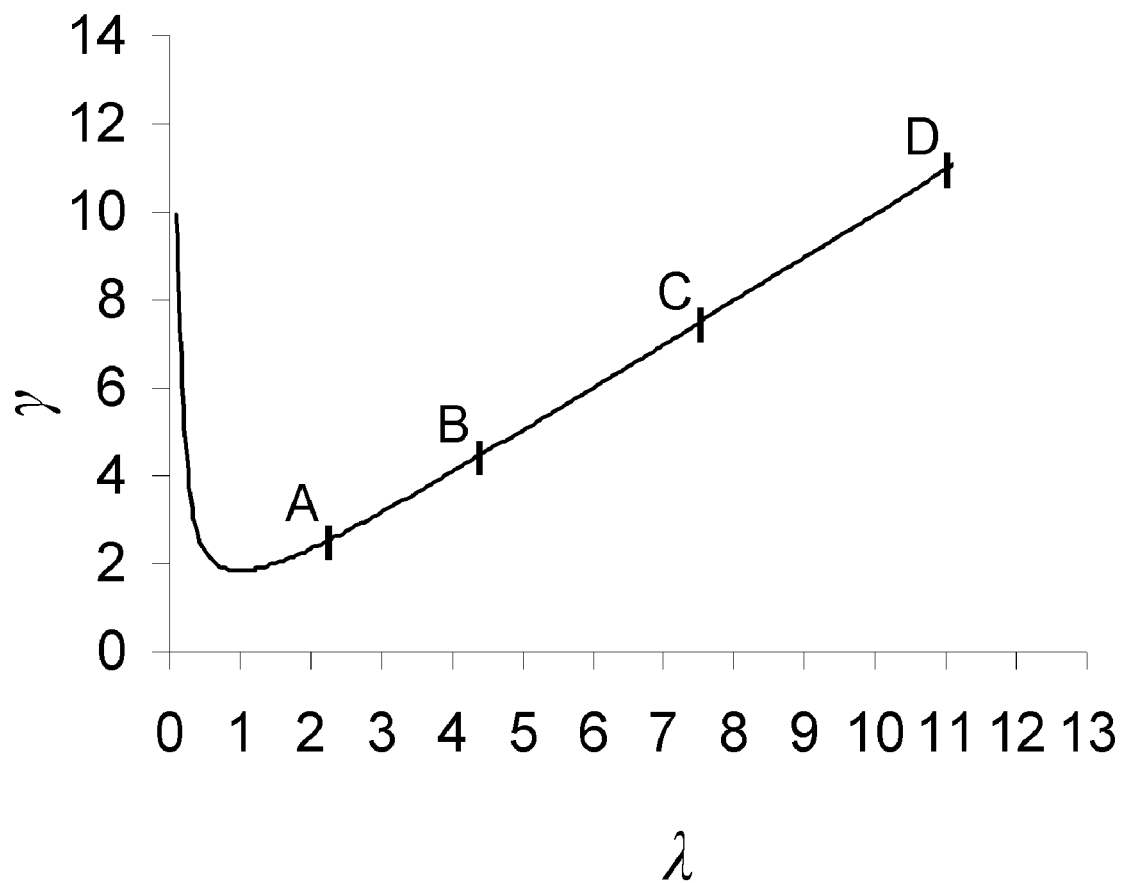
FIG. 3 is a graph showing deformation shear strain as a function of the thickness ratio for a machining operation performed in accordance with the invention.

Using the above equation, the deformation shear strain ($\gamma$) is plotted as a function of the thickness ratio ($\lambda$) in FIG. 3. The deformation shear strain value can be seen to increase monotonically from points A to D in FIG. 3, which corresponds to increasing separation between the cutting and constraining members 14 and 16. Beyond point D (the upper limit for occurrence of extrusion), $t_c$ is larger than the chip thickness that would result from an unconstrained machining technique as disclosed in commonly-assigned U.S. Pat. No. 6,706,324 to Chandrasekar et al. (discussed previously). As such, when the separation between the constraint edge 20 and the cutting tool rake face 22 (i.e., the thickness ($t_c$) of the extrusion 26) exceeds the undeformed, unconstrained chip thickness, the process devolves to simple chip formation in machining. Furthermore, if the thickness ratio ($\lambda$) is 1 (such that $t_c$ equals $t_o$) the process of this invention is generally equivalent to an ECAE process.

In a first of the investigations, the tool assembly 12 represented in FIG. 2 was installed on a 10 HP lathe. The cutting and constraining members 14 and 16 of the assembly 12 were formed of high-speed steel, with the former having a tool rake angle ($\alpha$) of about +5°. The investigation would demonstrate that a considerably stable process in conjunction with a wide range of deformation strains was possible with this configuration. The effect of deformation was then studied for different deformation strains by adjusting the opening between the rake face 22 and the constraint edge 20 to obtain thickness ratios ($\lambda$) of about 1.8, 4.2, 7.4, and 11. These deformation conditions are denoted as points A, B, C and D in FIG. 3, in which condition D represents the point at which the opening between the rake face 22 and the constraint edge 20 is sufficiently large to result in simple, unconstrained chip formation. FIG. 3 shows that when the thickness ratio ($\lambda=t_c/t_o$) is greater than one, deformation strain ($\gamma$) increases with increasing values of $t_c$ for a given value of $t_o$. At values of $\lambda$ greater than one, FIG. 3 shows that deformation shear strains ($\gamma$) in the range of about 2.2 to about 11 were imposed. As noted above, if the constraint edge 20 is adjusted so that $t_c$ exceeds the chip thickness corresponding to simple machining, extrusion of the machined chip no longer occurs and the process is effectively ordinary chip formation in machining. For the case being considered here, this corresponds to condition D in FIG. 3, in which the thickness ratio ($\lambda$) is about 11 and the deformation strain ($\gamma$) value is about 11.

The workpiece used in the investigation was formed of commercially-pure oxygen-free high-conductivity copper (OFHC-Cu) with an initial Vickers hardness of about 97 kg/mm$^2$ and an average grain size of about 150 micrometers. The workpiece had a diameter of about 10 cm, and was rotated to obtain a substantially constant surface velocity (v) of about 0.2 m/s. The tool assembly 12 was advanced toward the workpiece at a substantially constant feed rate (t) of about 250 micrometers/rev. The Vickers microhardnesses of the resulting extruded materials (26 in FIG. 2) were determined from metallographically polished samples. Care was taken during Vickers indentation tests to obtain similar sized indents for the different samples so that a reliable comparison of their hardness values could be drawn. Three-millimeter diameter disks were punched out of the deformed samples obtained for different deformation strains. These disks were first reduced to a thickness of about 150 micrometers by fine abrasive grinding, and then made electron transparent by electrolytic thinning using a solution of about 33% by volume phosphoric acid and about 67% water in a Struers Tenupol-5 setup at about 4V and about 14° C. The thinned, electron transparent samples were then studied in a JEOL 2000FX Transmission Electron Microscope (TEM) operating at about 200 KV.

Vickers hardness values corresponding to different levels of deformation strain induced during the investigation are shown in Table 1. The hardness value corresponding to the lowest value of strain ($\gamma=2.2$) is somewhat lower than that observed for the material deformed to a strain of $\gamma=11$. However, it is evident that the effect of strain on the hardness of the deformed OFHC-Cu extrusions is mostly negligible, indicative of rapid flow-stress saturation at these large values of strain.

TABLE I

| | Average (kg/mm$^2$) | Standard Deviation (kg/mm$^2$) |
|---|---|---|
| Bulk OFHC-Cu | 97 | 3 |
| A: $\lambda$ = 1.8; $\gamma$ = 2.2 | 148 | 6 |
| B: $\lambda$ = 4.2; $\gamma$ = 4.3 | 157 | 5 |
| C: $\lambda$ = 7.4; $\gamma$ = 7.4 | 158 | 4 |
| D: $\lambda$ = 11; $\gamma$ = 11 | 157 | 3 |

Figure 4:
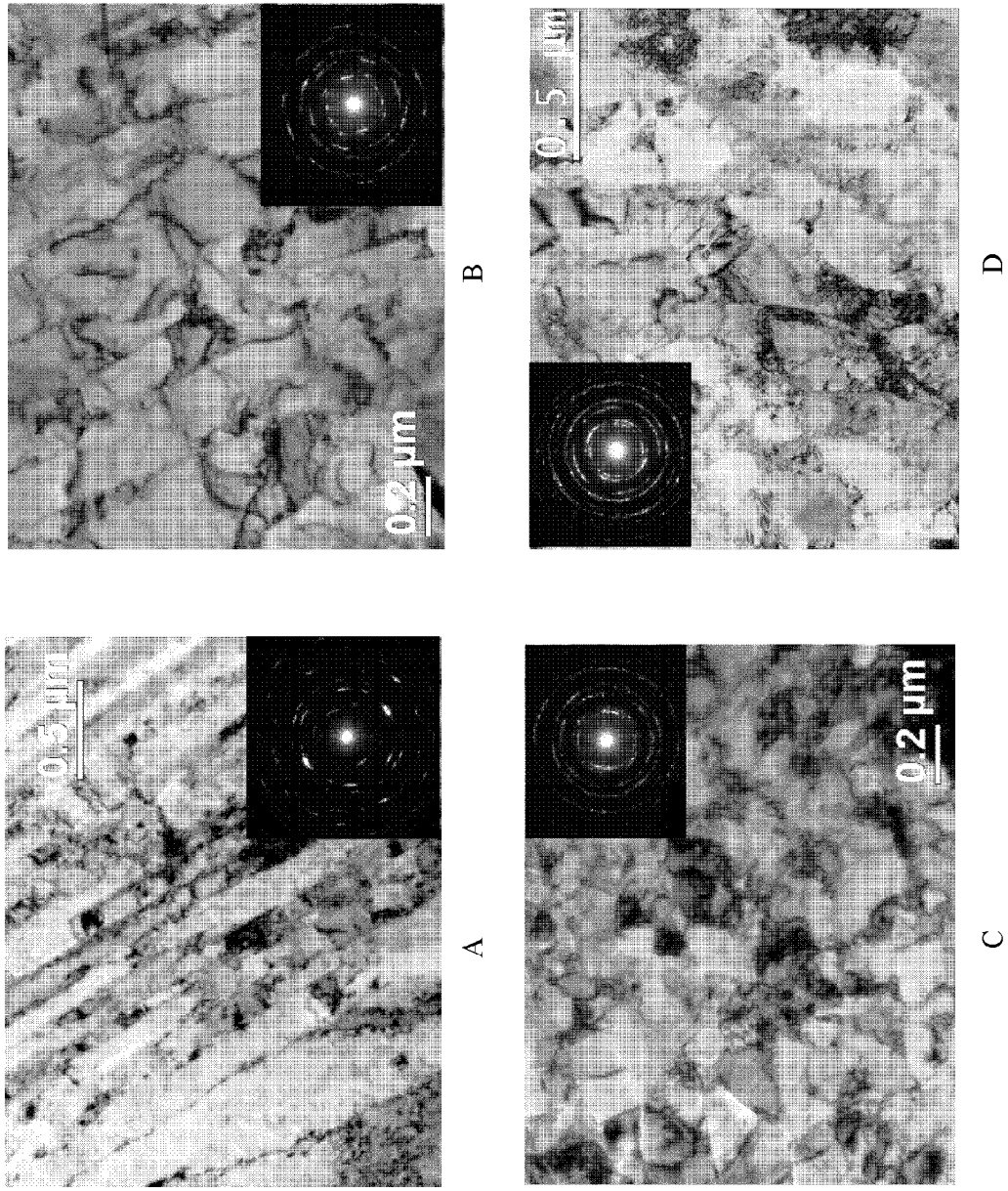
FIG. 4 shows four sets of TEM images and diffraction patterns (insets) of nanocrystalline monolithic bodies produced from OFHC-Cu in accordance with the shear strains and thickness ratios corresponding to points A, B, C and D in FIG. 3.

FIG. 4 shows TEM images (labeled A, B, C, and D) of samples produced at the different strain rates (A, B, C, and D, respectively) of FIG. 3. Corresponding selected area diffraction patterns are shown as insets in each image. The images A through D evidence a progressive refinement and formation of an UFG microstructure occurred with increasing values of strain. Image A of FIG. 4 shows an elongated microstructure produced at the relatively low value of $\gamma=2.2$. At the increased strain value of $\gamma=4.3$ in image B, an elongated microstructure shows signs of increasing levels of grain sub-division and a formation of more equi-axed grains. This transition becomes even more apparent in images C and D of FIG. 4, in which the larger deformation strains ($\gamma=7.4$ and 11, respectively) have resulted in essentially equi-axed UFG structures. In consonance with this progressive refinement of the chip microstructure, the diffraction patterns can also be seen to progressively transit from what is practically a smeared single-crystal pattern in image A to a diffraction pattern that is indicative of larger misorientation angles. Though the magnitude of the increase in grain misorientation angle was not determinable, an increase was nonetheless clearly evident.

The observed transition from an elongated low misorientation microstructure at lower deformation strain values to an equi-axed high misorientation microstructure at larger deformation strain values is a characteristic of large strain deformation of materials consistent with that observed in ECAE and chip formation using the machining techniques of Chandrasekar et al. During chip formation using cutting tools with positive rake angles and low deformation strain levels, the chips are made up of elongated structures, whereas more negative rake angles tend to produce chips with equi-axed grains. As such, in conventional machining control of deformation strain is possible by varying the tool rake angle. However, the dependence of deformation strain on rake angle can only be determined on a case-by-case basis via a series of experiments performed with the different tool rake angles of interest. Only after establishing this relationship can the particular machining process be carried out to controllably induce a particular deformation strain in a material. In contrast, the LSEM process of this invention enables strain control over a wide range for a given tool rake angle by varying the degree of extrusion constraint during chip formation to vary the deformation strain. Furthermore, the degree of extrusion constraint achieved with the present invention produces a deformation field that facilitates an estimation of the deformation strain, allowing much greater control over the imposition of the strain value and the resultant deformed microstructure. Subsequent preliminary studies have indicated that the results obtained with constrained machining techniques as generally described above can be obtained with a variety of materials, including a variety of metals, ceramics, composites, and intermetallic materials. Appropriate machining conditions will typically differ for different materials, but can be readily determined by experimentation and verified by the presence of nanocrystalline grains.

The deformation strain and consequently the deformed microstructure are controlled by varying the thickness ratio ($\lambda$), which is dependent on the spacing between the cutting and constraining members 14 and 16, in particular, the separation between the cutting tool rake face 22 and the constraint edge 20. By limiting this spacing to establish the thickness ($t_c$) of the extrusion 26, a level of control over the dimensions of the extrusion 26 is achieved that is otherwise impossible in SPD by conventional machining. The investigation reported above also showed that the resulting deformed material can be produced to have a controlled and predetermined thickness ($t_c$) by adjusting the spacing between the cutting and constraining members 14 and 16, in particular, the separation between the cutting tool rake face 22 and the constraint edge 20. This ability to produce dimensionally controlled nanostructured materials in a single pass operation is particularly attractive. If not constrained, limited control of the longitudinal and cross-sectional shape of the material (chip 24) as it leaves the workpiece 10 would be primarily through the machining conditions (e.g., feed and depth of cut) and the geometrical parameters of the tool. By appropriately sizing and shaping the opening between the rake face 22 and the constraint edge 20, and the shape of the passage defined by and between the cutting member 14 and the constraining member 16, the LSEM process of this invention can produce extrusions 26 having a wide variety of cross-sectional shapes, including round (e.g., circular and elliptical bars, wires, and filaments) and rectilinear (e.g., foils, sheets, bars, and ribbons), as well as having various thicknesses and essentially any length.

As noted above, by forming the tool assembly 12 to include lateral walls or surfaces 30 (shown in phantom in FIG. 2) that interconnect the opposing surfaces of the cutting and constraining members 14 and 16 to effectively form an extrusion orifice, the tool assembly 12 is further capable of altering the width dimension (w) of the extrusion 26 (i.e., the dimension orthogonal to the thickness dimension ($t_c$) determined by the rake face 22 and constraint edge 20). Such a capability can enable the manufacture of, for example, nano-structured sheet material of controlled dimensions.

Depending on the particular machinery used, the primary limitation of the LSEM process may be the level of thrust capable with the particular machinery to plunge the tool assembly 12 into wider and/or stronger workpieces 10. The capability of large scale production of bulk nanostructured material using the LSEM process of this invention has been demonstrated in a linear configuration on a press. In the case of a turning operation, an additional limitation is the availability of torque to press the workpiece 10 into the opening between the cutting and constraint edges 20 and 22. It is foreseeable that by creating a scaled up version of the tool assembly 12 shown in FIG. 2, combined with a more robust drive, large scale production of bulk nanostructured material would be feasible with a turning operation. It is also foreseeable that this invention can be extended to large scale production of bulk nanostructured material with milling operations, such as side milling.

Figure 5:
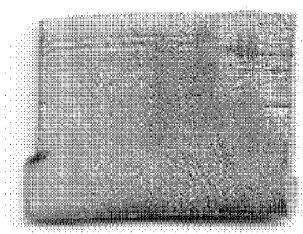
FIG. 5 shows scanned images of large-scale tantalum and copper articles (sheets) produced using a machining (linear) operation performed in accordance with the invention.
Figure 5:
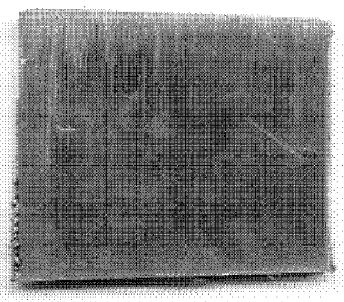
Figure 5:

FIG. 5 is a scanned image of a tantalum sheet and a copper sheet produced by a plane strain deformation LSEM process in accordance with the invention. The sheets are of sufficient size (in excess of one square inch) to permit their direct use in structural applications. Similar-sized sheets of other materials have also been produced in this manner, including aluminum 6061-T6 and titanium.

Figure 6:
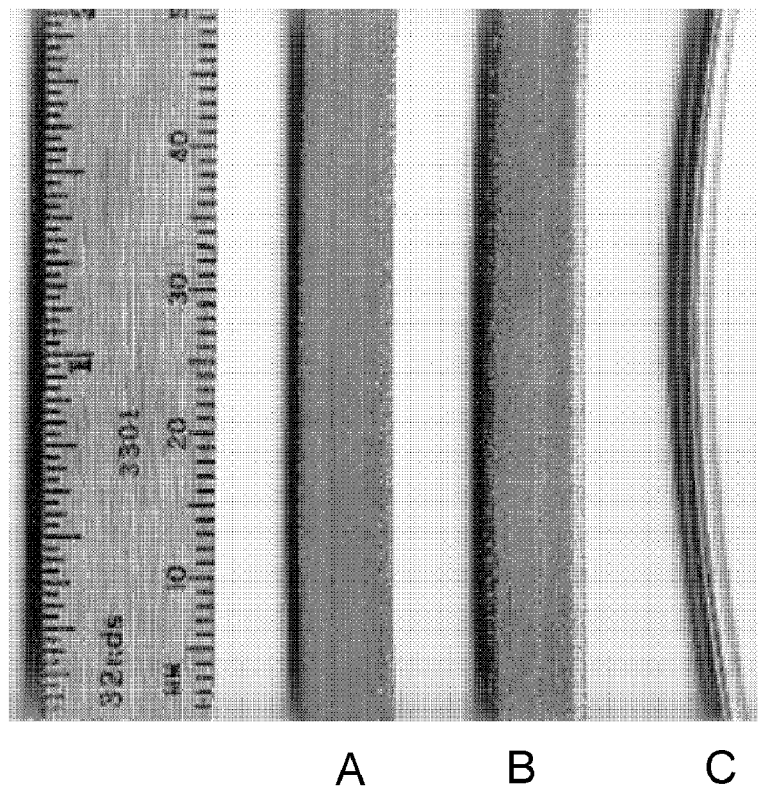
FIG. 6 shows scanned images of large-scale copper articles (foils, plates, and bars) produced using a machining operation performed in accordance with the invention.

FIG. 6 is a scanned image showing additional specimens machined in accordance with this invention from bulk OFHC copper to have UFG microstructures. Specimens A ($\gamma$=2.2, $t_c$=0.5 mm) and B ($\gamma$=4.3, $t_c$=1 mm) are examples of continuous thick foils and plates, respectively, created in accordance with the plane strain LSEM process represented in FIG. 2. Also of interest is the application of this invention to non-plane strain processes. Specimen C is a 3 mm diameter continuous round bar formed using a non-plane strain LSEM process. Grain sizes of all specimens were in the range of about 100 to about 700 nm. The specimens of FIG. 6 evidence significant shape change and control can be effected by the LSEM process of this invention when creating bulk nanostructured materials.

In view of the various specimens shown in FIGS. 5 and 6, it is evident that the present invention offers intriguing possibilities for the direct manufacture of bulk forms such as foils, plates, and bars (as well as finer bulk forms such as ribbons, wires, and filaments), with a fine-scale microstructure in a variety of metal and alloy systems. Furthermore, because of the high levels of superimposed hydrostatic compression prevailing in the deformation zone ahead of the cutting tool and the ability to vary the strain rate (for example, over four orders of magnitude in accordance with Chandrasekar et al.), even materials with limited number of slip systems (or ductility) like titanium can be subjected to a high level of deformation at ambient temperature.

Based on the teachings of Chandrasekar et al. and the investigations reported above, it is believed that microstructures with nano-scale grain sizes (i.e., less than 1000 nm) can be readily produced with the LSEM process of this invention. For example, it is believed that grain sizes of about 50 to 500 nm, and likely below 300 and even 100 nm, can be consistently produced if machining conditions impose very large strain deformations without exceeding speeds that would cause temperature-time conditions resulting in excessive grain growth.

Figure 7:
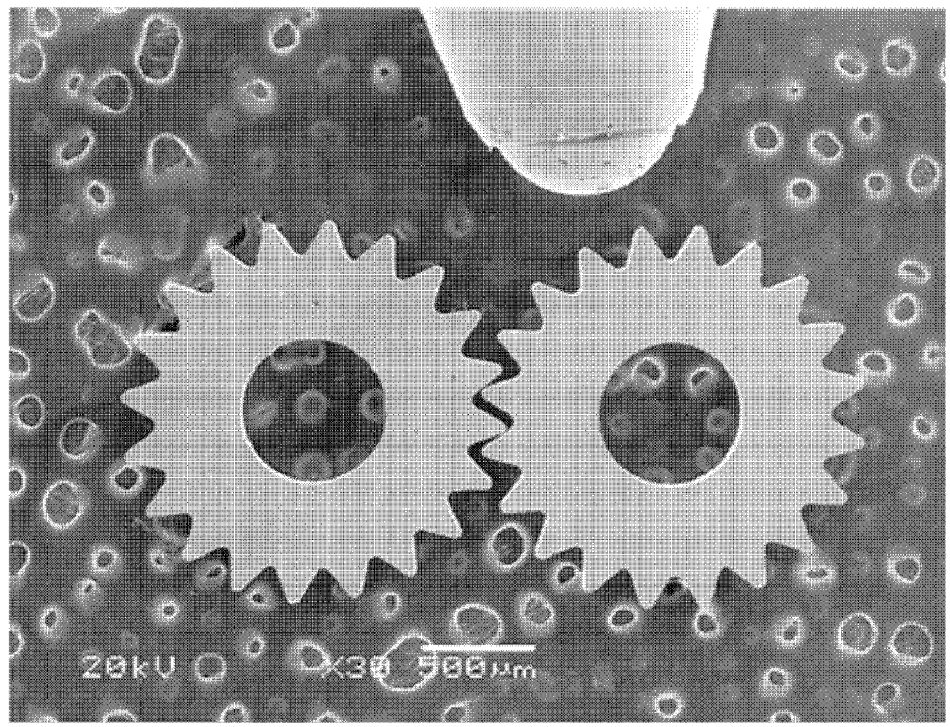
FIG. 7 shows scanned images of small-scale articles (gears) machined from a foil produced using a machining operation performed in accordance with the invention.
Figure 7:
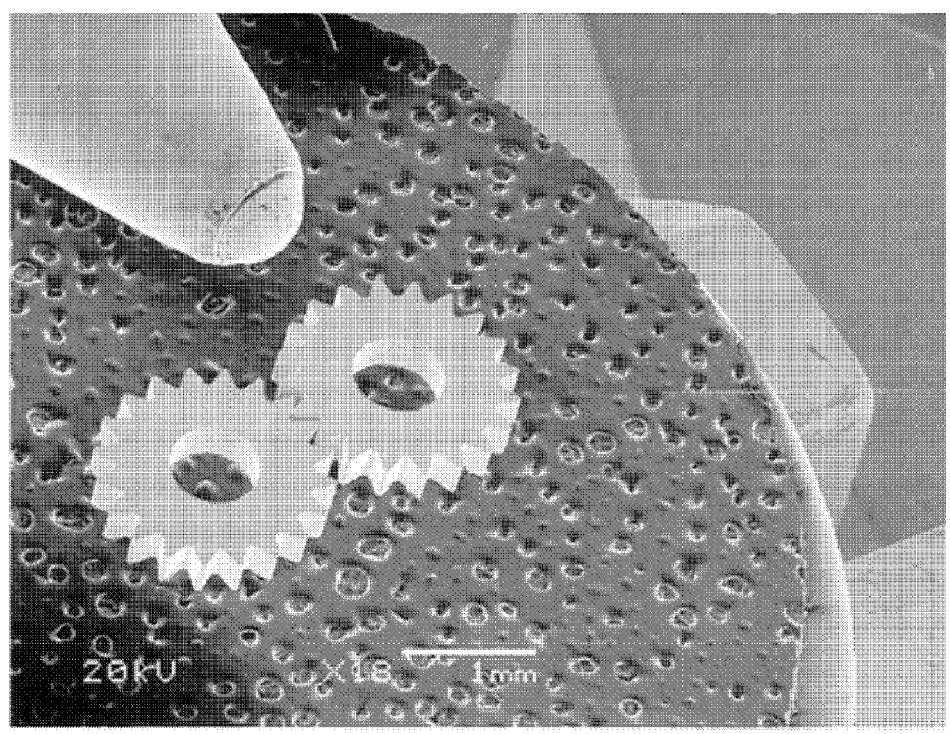

While the extrusions shown in FIGS. 2, 5, and 6 are continuous monolithic bodies, subsequent processing can be used to cut, break, or otherwise separate the extrusions into desired lengths. The resulting monolithic body can be a final product suitable for use as-is, or undergo further processing to yield a final product that consists essentially or entirely of nano-crystals or of grains grown from nano-crystals. For example, on the basis of Chandrasekar et al., the mechanical properties of nanostructured materials produced by the present invention are believed to be maintainable through certain mechanical and thermal processing, including conventional deformation processes such as stamping, punching, forging, etc., and conventional thermal processes such as annealing, etc. Hardness and other mechanical properties can be retained though small changes in microstructure may occur. The monolithic body can also undergo subtractive processes (e.g., machining) or additive processes (e.g., coating) to yield a final product. As an example, FIG. 7 shows two scanned images of a pair of small gears cut at Sandia National Laboratories using a micro-Electro Discharge Machining (EDM) process from a foil of nanocrystalline Inconel 718 formed by the LSEM process of this invention. Finally, one or more nanostructured monolithic bodies or fragments thereof can be placed in a matrix material as a reinforcement material to yield a final product having a composite composition.

While the invention has been described in terms of particular embodiments, it is apparent that other forms could be adopted by one skilled in the art. Accordingly, the scope of the invention is to be limited only by the following claims.

The invention claimed is:

1. A process of producing a monolithic body, the process comprising the steps of:

continuously producing a chip having a microstructure by engaging a solid body with a cutting edge of a cutting member while the solid body and the cutting edge move relative to each other; and simultaneously extruding the chip in the immediate vicinity of the cutting edge and as the chip is separated from the solid body by the cutting edge to continuously plastically deform the chip and produce a monolithic body immediately downstream of the cutting edge that has at least one cross-sectional dimension that differs from the chip, the extruding step being performed at least in part by a constraining member that defines an opening with the cutting edge through which the chip passes and is plastically deformed to produce the monolithic body;

wherein the chip has a cross-sectional shape having two orthogonal dimensions comprising a thickness dimension determined by the cutting member and the constraining member and a width dimension orthogonal to the thickness dimension, and the extruding step constrains the width dimension.

2. The process according to 1, wherein the chip is continuously produced to have a nanostructured microstructure and the monolithic body is nanostructured.

3. The process according to claim 1, further comprising the step of altering the size of the opening to produce a change in a deformation strain level induced in the chip during the extruding step.

4. The process according to claim 1, wherein the cutting member and the constraining member are integrally formed regions of a tool.

5. The process according to claim 1, wherein the constraining member comprises a die through which the chip is forced as a result of being continuously produced.

6. The process according to 1, wherein the cutting edge is stationary and the solid body moves relative to the cutting edge during the continuous producing step.

7. The process according to 6, wherein the solid body rotates during the continuous producing and extruding steps.

8. The process according to 1, wherein the solid body is stationary and the cutting edge moves relative to the solid body during the continuous producing step.

9. The process according to 1, wherein the continuous producing and extruding steps are performed by a linear machining operation.

10. The process according to 1, wherein the extruding step induces a change in only the width dimensions.

11. The process according to 1, wherein the extruding step induces a change in each of the two orthogonal dimensions.

12. The process according to 1, wherein the monolithic body has a round cross-sectional shape.

13. The process according to 1, wherein the monolithic body has a rectilinear cross-sectional shape.

14. The process according to 1, further comprising performing on the monolithic body at least one treatment chosen from the group consisting of thermal treatments, mechanical treatments, and thermo-mechanical treatments.

15. The process according to 1, further comprising the steps of separating the monolithic body from the chip and then plastically deforming the monolithic body to form a final product.

16. The process according to 1, further comprising removing material from the monolithic body to form a final product.

17. The process according to 1, further comprising at least one additive material process performed on the monolithic body to form a final product.

18. The process according to 1, further comprising the steps of separating the monolithic body from the chip and then placing the monolithic body in a matrix material to form a final product in which the monolithic body is a reinforcement material for the matrix material.

19. The process according to 1, wherein the solid body is formed of a material chosen from the group consisting of metallic, intermetallic, composites, and ceramic materials, such that the monolithic body is entirely formed of the material.

* * * * *

UNITED STATES PATENT AND TRADEMARK OFFICE
CERTIFICATE OF CORRECTION

PATENT NO. : 7,617,750 B2 Page 1 of 1
APPLICATION NO. : 11/567293
DATED : November 17, 2009
INVENTOR(S) : Wilfredo Moscoso et al.

It is certified that error appears in the above-identified patent and that said Letters Patent is hereby corrected as shown below:

On the title page, item [54] should read:

[54] Process of Producing ~~Nanocrystalline~~ [Monolithic] Bodies

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,617,750 B2  Page 1 of 1
APPLICATION NO. : 11/567293
DATED : November 17, 2009
INVENTOR(S) : Wilfredo Moscoso et al.

It is certified that error appears in the above-identified patent and that said Letters Patent is hereby corrected as shown below:

On the title page, item [54] and at Column 1, lines 1 and 2, title should read:

Process of Producing Monolithic Bodies

This certificate supersedes the Certificate of Correction issued February 23, 2010.

Signed and Sealed this

Sixteenth Day of March, 2010

David J. Kappos
*Director of the United States Patent and Trademark Office*